US012774259B2

(12) United States Patent
Riehl et al.

(10) Patent No.: US 12,774,259 B2
(45) Date of Patent: Oct. 27, 2026

(54) PARTICLE ENHANCED CERAMIC MATRIX COMPOSITE WITH NO PARTICLES ON SURFACE PLIES

(71) Applicant: Raytheon Technologies Corporation, Farmington, CT (US)

(72) Inventors: John D. Riehl, Hebron, CT (US); Brendan Lenz, North Branford, CT (US); Zachary Paul Konopaske, West Hartford, CT (US); Olivier H. Sudre, Glastonbury, CT (US); Nil Parikh, Newington, CT (US); Sarah Annette Frith, Layton, UT (US)

(73) Assignee: RTX Corporation, Farmington, CT (US)

( * ) Notice: Subject to any disclaimer, the term of this patent is extended or adjusted under 35 U.S.C. 154(b) by 598 days.

(21) Appl. No.: 18/205,079

(22) Filed: Jun. 2, 2023

(65) Prior Publication Data

US 2024/0400467 A1 Dec. 5, 2024

(51) Int. Cl.
*C04B 41/50* (2006.01)
*C04B 35/622* (2006.01)
(Continued)

(52) U.S. Cl.
CPC ........ *C04B 41/87* (2013.01); *C04B 35/62281* (2013.01); *C04B 41/4535* (2013.01); *C04B 41/50* (2013.01); *C04B 2235/5244* (2013.01); *C04B 2235/5268* (2013.01); *C04B 2235/5436* (2013.01); *C04B 2235/5445* (2013.01)

(58) Field of Classification Search
None
See application file for complete search history.

(56) References Cited

U.S. PATENT DOCUMENTS 5,928,775 A 7/1999 Dichiara et al.
10,443,386 B2 * 10/2019 Matsumoto ......... C04B 35/6263
(Continued)

FOREIGN PATENT DOCUMENTS

EP 3106752 B1 1/2020
EP 3650424 A1 5/2020
(Continued)

OTHER PUBLICATIONS

Extended European Search Report for EP Application No. 24178082.4, dated Nov. 19, 2024, 8 pages.

*Primary Examiner* — David P Turocy
(74) *Attorney, Agent, or Firm* — Kinney & Lange, P.A.

(57) ABSTRACT

A method of forming a ceramic matrix composite includes preparing a plurality of fibrous ceramic plies by applying a binder solution loaded with ceramic particles to each of a first subset of plies, and applying the binder solution without ceramic particles to each of a second subset of plies. The method further includes arranging the plurality of plies to form a preform with a gradient along a thickness direction of the preform by stacking the first subset of plies to form a first zone of the preform, and stacking individual ones of the second subset of the plies on both sides of the first zone to form a second zone on each side of the first zone. Loading of the ceramic particles is higher in the first zone than in the second zones. The method further includes densifying the preform with a ceramic matrix.

16 Claims, 3 Drawing Sheets

(51) Int. Cl.

| | |
|---|---|
| ***C04B 41/45*** | (2006.01) |
| ***C04B 41/87*** | (2006.01) |

(56) References Cited

U.S. PATENT DOCUMENTS

| | | | |
|---|---|---|---|
| 11,046,615 | B2 | 6/2021 | Tang et al. |
| 2021/0070663 | A1 | 3/2021 | Sellappan et al. |
| 2021/0238101 | A1 | 8/2021 | Weaver et al. |

FOREIGN PATENT DOCUMENTS

| | | | | | |
|---|---|---|---|---|---|
| EP | 4144709 | A1 | | 3/2023 | |
| GB | 2507080 | A | * | 4/2014 | ............. B29C 70/46 |
| JP | H0985866 | A | * | 3/1997 | |
| JP | 2007119333 | A | * | 5/2007 | ............. C04B 35/80 |
| WO | WO-2020209848 | A1 | * | 10/2020 | ............. C04B 35/80 |

* cited by examiner

PARTICLE ENHANCED CERAMIC MATRIX COMPOSITE WITH NO PARTICLES ON SURFACE PLIES

BACKGROUND

The present invention relates to ceramic matrix composites (CMCs), and more particularly, to the preparation of ceramic materials for use in ceramic matrix composites.

In the processing of CMCs, there is a need to infiltrate matrix within and around fibrous tows of a preform. Depending on the preform architecture, there can be large voids between adjacent tows of a preform that can become large defects after matrix infiltration. Such defects diminish interlaminar properties of the composite structure. Accordingly, a need exists for means of reducing such voids.

SUMMARY

A method of forming a ceramic matrix composite includes preparing a plurality of fibrous ceramic plies by applying a binder solution loaded with ceramic particles to each of a first subset of plies, and applying the binder solution without ceramic particles to each of a second subset of plies. The method further includes arranging the plurality of plies to form a preform with a gradient along a thickness direction of the preform by stacking the first subset of plies to form a first zone of the preform, and stacking individual ones of the second subset of the plies on both sides of the first zone to form a second zone on each side of the first zone. Loading of the ceramic particles is higher in the first zone than in the second zones. The method further includes densifying the preform with a ceramic matrix.

A gradient preform includes a stacking arrangement of fibrous ceramic plies including a first zone having a first subset of plies, and a second zone disposed on each side of the first zone, each second zone having a second subset of plies. The preform further includes ceramic particles dispersed throughout the first zone such that loading of the ceramic particles is higher in the first zone than in the second zones.

Figure 1:
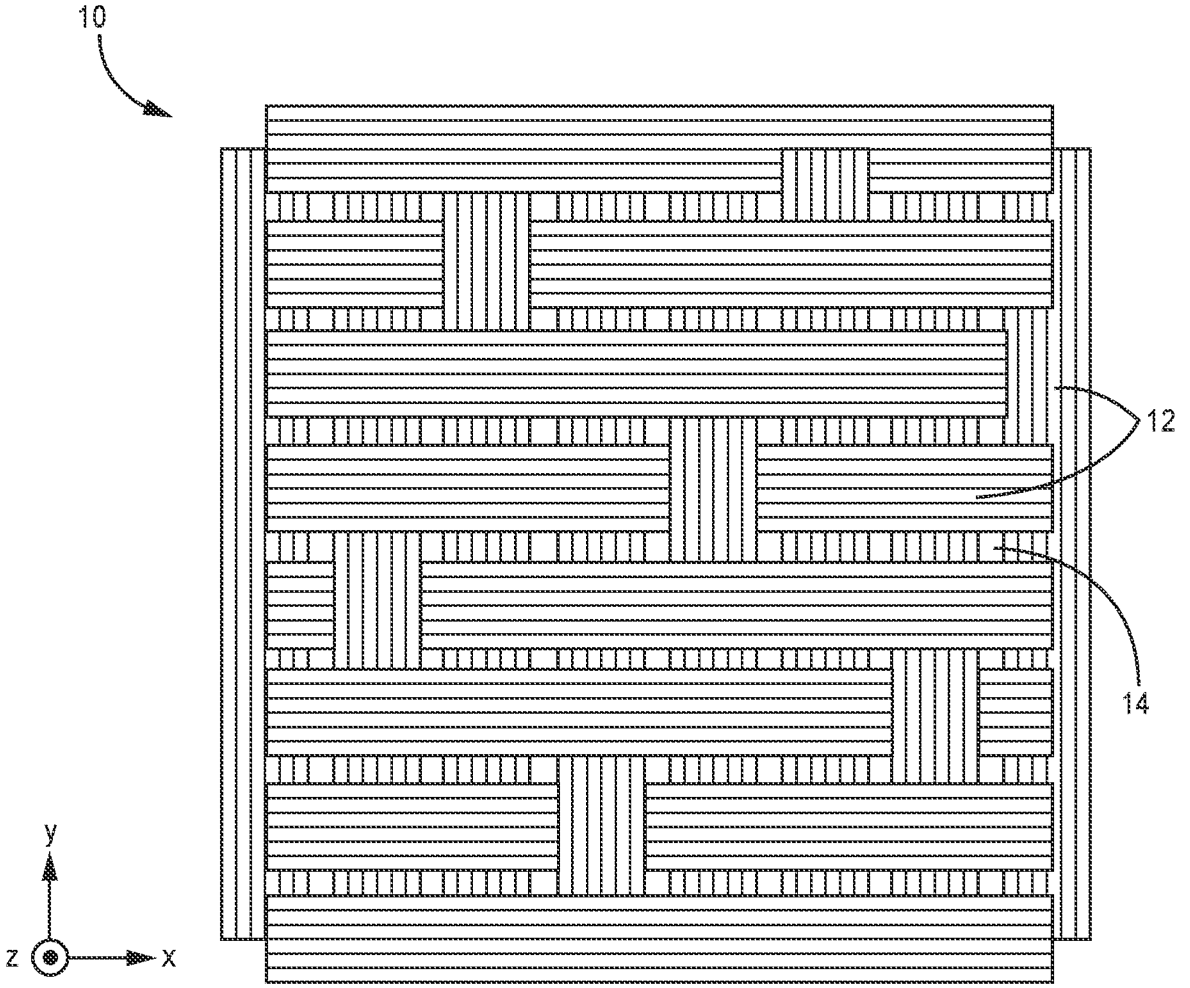
FIG. 1 is a simplified illustration of a fibrous ceramic ply.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a particle-loaded preform used to form a CMC component (e.g., for a gas turbine engine). More specifically, a gradient approach to particle loading creates the highest particle loading concentration at the midplane region of the preform and transitions to a particle-free surface (i.e., outer) region to allow for a more uniform infiltration of reactant vapors during chemical vapor infiltration (CVI). The resulting CMC component can have a more uniformly deposited matrix.

FIG. 1 is a simplified illustration of ceramic ply 10. As shown, ply 10 is a woven fabric formed from perpendicular warp and weft tows 12 extending along the x and y-axis, respectively. Tows 12 can be formed from bundled fibers of silicon carbide or other suitable ceramic material. Ply 10 can have a harness-satin (e.g., 3, 5, 8, etc.) woven architecture, as shown in FIG. 1, but plain and twill woven architectures, as well as braided (e.g., biaxial or triaxial) structures and unidirectional tapes are also contemplated herein. The particular spacing between adjacent warp or weft tows 12 can be generally uniform along the length of the respective tows 12, or can vary along the length of the respective tows 12. Variances typically arise from manufacturing imperfections. Spaces between adjacent pairs of warp and weft tows 12 define inter-tow pores 14.

Figure 2:
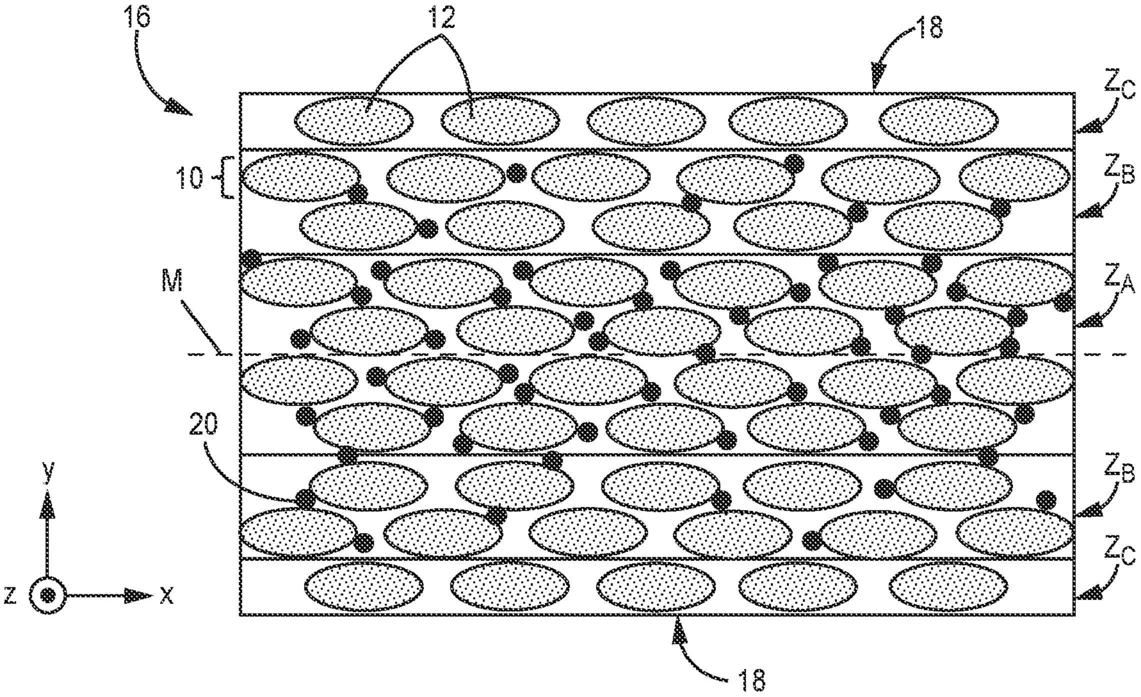
FIG. 2 is a simplified cross-sectional illustration of a preform formed from a stack of fibrous ceramic plies variously loaded with inorganic particles.

During preforming, a number of plies 10 can be laid up in a stack. FIG. 2 is a simplified cross-sectional illustration of preform 16 formed from ten plies 10 stacked along the z-axis (i.e., thickness direction of preform 16). Weft tows 12 are visible in the cross-sectional plane shown. Preform 16 includes oppositely disposed outer surfaces 18 with midplane M halfway therebetween. It can be desirable to deposit inorganic (e.g., ceramic) particles 20 within individual plies 10 and stack them such that particle loading is greatest (i.e., porosity is lowest) near midplane M, and lessens moving toward each outer surface 18. This creates a gradient microstructure along the thickness direction of preform 16 forming a gradient preform.

Particles 20 can be formed from one or more of silicon carbide, boron carbide, hafnium oxide, hafnium boride, aluminum oxide, ytterbium oxide, or zirconium boride, to name a few non-limiting examples. Particles 20 can be a homogeneous or heterogenous mixture of generally spherical, elongate, or otherwise irregularly shaped particles (e.g., short ceramic fibers). Particle size for an individual particle 20 can range from 0.5 microns to 100 microns, and particles 20 can further be a homogeneous or heterogenous mixture of such particle sizes. The number and/or size of particles 20 can be used to control particle loading throughout preform 16.

Preform 16 can be divided into a plurality of zones (collectively "zones Z") defining the gradient microstructure. Particle loading can be highest at midplane zone $Z_A$, which, as shown in FIG. 2, includes at least four plies 10. Particle loading can range from 5 wt % to 15 wt % in midplane zone $Z_A$, with the wt % being a function of the fiber content (i.e., of tows 12) and particles 20. Intermediate zones $Z_B$ can be in direct contact with and disposed on either side of midplane zone $Z_A$. Each intermediate zone $Z_B$ can include at least two plies 10. The particle loading in each midplane zone $Z_B$ can be less than the particle loading of midplane zone $Z_A$. Finally, surface zones $Z_C$ are in direct contact with intermediate zones $Z_B$ and are the outermost zones of preform 16. Each surface zone $Z_C$ can include a single ply 10. Each surface zone $Z_C$ is free from particles 20, that is, no particles 20 are deposited on the outermost plies 10 prior to layup. A small number of particles 20 from other zones Z may migrate into either surface zone $Z_C$ during processing. Being generally free from particles 20, particle loading of surface zones $Z_C$ is lower than in intermediate zones $Z_B$. Accordingly, surface zones $Z_C$ can have a higher porosity than intermediate zones $Z_B$, which can have a higher porosity than midplane zone $Z_A$. Particle loading in each surface zone $Z_C$ can be less than 5 wt %.

In alternative embodiments, any zone Z can include more or fewer plies 10 than depicted in FIG. 2. For example, in a preform having more than ten plies 10, Each surface zone $Z_C$ can include two plies 10. Midplane and/or intermediate zones can also have a greater number of plies 10, or fewer plies 10 depending on the total number of plies 10 in the preform. Additional (e.g., intermediate) zones Z can be included by including additional plies 10, or by the redistribution of zones Z among the ten plies 10 depicted in FIG. 2. Further, in another alternative embodiment, preform 16 can include only two types of zones-particle-free surfaces zones surrounding a single particle-loaded (e.g., midplane) zone.

Figure 3:
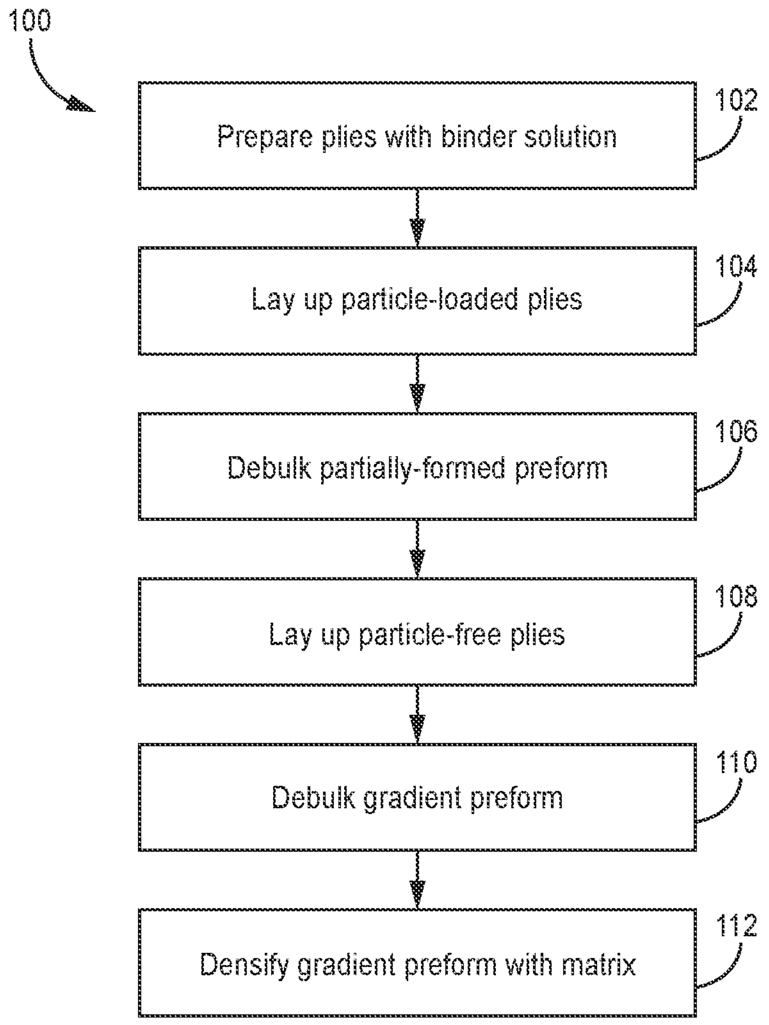
FIG. 3 is a flowchart illustrating select steps of a method for forming a CMC component from the preform of FIG. 2.

FIG. 3 is a flowchart illustrating steps 102-112 of method 100 for forming a CMC component from a gradient preform (e.g., preform 16). At step 102, individual plies (e.g., plies 10) can be prepared prior to layup. Step 102 includes the application of a binder solution with particles (e.g., particles 20) to the plies intended for non-surface zones, and a binder-only solution for the plies intended for surface zones. In one example, a slurry spray process can be used. A solution containing a polymer binder (e.g., polyvinyl alcohol—PVA, or polyvinyl butyral—PVB), a suitable solvent (e.g., water for PVA or an alcohol for PVB), and an optional dispersant can be loaded with particles and sprayed onto individual plies. Surface zone plies can be sprayed with a solution of binder and solvent. In a second example, a pipetting process is used in which droplets of a solution of binder and solvent can be loaded with particles and applied to the surfaces of the plies. Similar to the previous examples, surface zone plies receive droplets of a binder solution only. In a third example, plies can be impregnated with a binder solution loaded with particles to form pre-preg plies. Similar to the previous two examples, surface zone plies can be impregnated with the binder solution only. The wt % of binder in solution can be higher in the third example than in the first or second examples. For any of the application examples, distinct binder solutions with different particle concentrations can be used on the midplane zone and intermediate zone plies to achieve higher midplane zone particle loading, or the same binder can be applied in different quantities to achieve a similar effect.

At step 104, particle-loaded plies can be laid up to form the midplane and intermediate zones. More specifically, plies with the highest particle loading can be stacked in the midplane zone. Plies with relative lower particle loading can be stacked and disposed on either side of the midplane zone to form intermediate zones. At step 106, the partially formed preform can be debulked/consolidated using one or a combination of mechanical and vacuum compressive force along with heat. This can nominally reduce the thickness of the preform and also remove at least some of the solvent from the binder solution. At step 108, plies prepared with only the binder solution (i.e., particle-free plies) can be laid up in contact with the intermediate zone(s) of the partially formed preform to form the surface zones of the gradient preform. Laying up particle-free plies after step 106 helps reduce the migration of particles from the intermediate and/or midplane zones into the surface zones. At step 110, debulking can be repeated on the entire gradient preform. Any loosely-adhered particles that migrate to the surface zones (i.e., migrant particles) between steps 106 and 110 can be optionally removed using a light brushing technique, the application of a lightly pressurized stream of air, etc.

In an alternative embodiment, the plies can be laid up in a different order, such as from one surface zone to the other. More specifically, a subset of particle-free plies intended for the inner surface of the preform can be laid up first. Layup can proceed with the plies of first intermediate zone, the midplane zone, the second intermediate zone, and finally, the outer surface zone plies. Debulking can occur repeatedly and at various stages in such an embodiment, such that steps 104-110 are differently ordered and some may be repeated. Such a layup can be necessary for non-planar preforms with inner plies becoming inaccessible during preforming, such as airfoils. In yet another alternative embodiment, all plies laid up can come from a stock of particle-loaded plies, which can be more economical with fewer manufacturing errors as it simplifies ply preparation. In such an embodiment, surface plies can be treated with brushing and/or pressurized air to remove at least a majority of the particles. Such removal techniques should be carried out more robustly/extensively than for the optional removal of migrant particles discussed above.

At step 112, the gradient preform can be densified with a matrix using CVI to form a CMC component. During densification, the plies are infiltrated by reactant vapors, and a gaseous precursor deposits on the ceramic tows. The matrix material can be silicon carbide or other suitable ceramic material. Densification is carried out until the resulting CMC has reached the desired residual porosity. Interface coating(s) (e.g., of boron nitride) can be deposited prior to the matrix to ensure that the composite fails in a non-brittle manner. In an alternative embodiment, densification can additionally and/or alternatively include other methodologies such as, but not limited to, melt infiltration (MI) and polymer infiltration and pyrolysis (PIP).

Because of the gradient microstructure of the preform, the matrix can deposit in an inside-out manner, referring directionally from the midplane to each outer surface 18, in a uniform manner. The increasing porosity from the midplane out prevents "canning off" of the preform region near the midplane, where the matrix deposits too quickly near the outer surface of the preform and prevents reactant vapors from accessing the midplane region. This can lead to asymmetrical densification with an undesirably porous midplane region compared to sufficiently densified outer surfaces. The inclusion of inorganic particles also provides additional surface area upon which the matrix deposits. The use of particle-free plies at the preform outer surfaces can be more cost effective than depositing particles throughout the preform thickness because fewer materials are needed to prepare surface plies.

After densification with matrix, additional particles (e.g., particles 20) can be applied to the outer surface of the CMC component in an optional smoothing step. Such a step can be carried out using a seal coating process suitable for ceramic substrates.

A CMC component formed from the disclosed gradient preform can be incorporated into aerospace, maritime, or industrial equipment, to name a few, non-limiting examples.

DISCUSSION OF POSSIBLE EMBODIMENTS

The following are non-exclusive descriptions of possible embodiments of the present invention.

A method of forming a ceramic matrix composite includes preparing a plurality of fibrous ceramic plies by applying a binder solution loaded with ceramic particles to each of a first subset of plies, and applying the binder solution without ceramic particles to each of a second subset of plies. The method further includes arranging the plurality of plies to form a preform with a gradient along a thickness direction of the preform by stacking the first subset of plies to form a first zone of the preform, and stacking individual ones of the second subset of the plies on both sides of the first zone to form a second zone on each side of the first zone. Loading of the ceramic particles is higher in the first zone than in the second zones. The method further includes densifying the preform with a ceramic matrix.

The method of the preceding paragraph can optionally include, additionally and/or alternatively, any one or more of the following features, configurations and/or additional steps:

The above method can further include applying the binder solution with the ceramic particles to a third subset of plies, and stacking individual ones of the third subset of plies on both sides of the first zone and between the first and second zones to form third zones on each side of the first zone.

In any of the above methods, arranging the preform can include forming the first zone, subsequently, forming the third zones, and debulking the first zone and the third zones.

Any of the above methods can further include subsequently, forming the second zones, and debulking the first zone, the second zones, and the third zones.

In any of the above methods, arranging the preform can include forming one of the second zones, subsequently, forming one of the third zones, subsequently, forming the first zone, subsequently, forming an other of the third zones, and subsequently, forming an other of the second zones.

Any of the above methods can further include debulking the first zone, the second zones, and the third zones.

Any of the above methods can further include removing migrant ceramic particles from the second zones using one of a brushing and blowing technique.

In any of the above methods, the step of densifying the preform with a ceramic matrix can include one or a combination of chemical vapor infiltration, melt infiltration, and polymer infiltration and pyrolysis.

In any of the above methods, the binder solution can include a solvent, a dispersant, and one of polyvinyl alcohol and polyvinyl butyral.

In any of the above methods, the ceramic particles can include one or a combination of silicon carbide, boron carbide, hafnium oxide, hafnium boride, aluminum oxide, ytterbium oxide, or zirconium boride.

In any of the above methods, the step of applying the binder solution to each of the first subset and the second subset of plies can include one of a spraying and pipetting technique.

In any of the above methods, each of the first subset and the second subset of plies can be impregnated with the binder solution.

A gradient preform includes a stacking arrangement of fibrous ceramic plies including a first zone having a first subset of plies, and a second zone disposed on each side of the first zone, each second zone having a second subset of plies. The preform further includes ceramic particles dispersed throughout the first zone such that loading of the ceramic particles is higher in the first zone than in the second zones.

The preform of the preceding paragraph can optionally include, additionally and/or alternatively, any one or more of the following features, configurations and/or additional components:

In the above preform, the plies can be formed from tows of silicon carbide.

In any of the above preforms, a tow architecture of each of the plies can be one of harness-satin, plain, twill, braid, and unidirectional.

In any of the above preforms, the ceramic particles can include one or a combination of silicon carbide, boron carbide, hafnium oxide, hafnium boride, aluminum oxide, ytterbium oxide, or zirconium boride.

In any of the above preforms, a size of the ceramic particles can range from 0.5 microns to 100 microns.

In any of the above preforms, a particle loading of the first zone can range from 5 wt % to 15 wt %.

In any of the above preforms, a particle loading of each of the second zones can be less than 5 wt %.

Any of the above preforms can further include a third zone disposed on both sides of the first zone and between the first zone and each of the second zone, each of the third zones having a third subset of plies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite, the method comprising:
- preparing a plurality of fibrous ceramic plies by:
  - applying a binder solution loaded with ceramic particles to each of a first subset of plies;
  - applying the binder solution without ceramic particles to each of a second subset of plies; and
  - applying the binder solution loaded with the ceramic particles to each of a third subset of plies;
- arranging the plurality of plies to form a preform with a gradient along a thickness direction of the preform by:
  - stacking the first subset of plies to form a first zone of the preform;
  - stacking individual ones of the third subset of plies on both sides of the first zone to form third zones on each side of the first zone; and
  - stacking individual ones of the second subset of the plies on each of the third zones such that each third zone is disposed between the first zone and a second zone,
  - wherein loading of the ceramic particles is higher in the first zone than in the second zones and the third zones; and
  - wherein arranging the preform comprises:
    - forming the first zone;
    - subsequently, forming the third zones;
    - subsequently debulking the first zone and the third zones;
    - subsequently forming the second zones; and
    - subsequently debulking the first zone, the second zones, and the third zones;
- removing, via a brushing technique or application of a pressurized stream of air, ceramic particles that have migrated into the second zones during debulking of any of the first, second, and third zones; and
- densifying the preform with a ceramic matrix.

2. The method of claim 1, wherein the step of densifying the preform with a ceramic matrix comprises one or a combination of chemical vapor infiltration, melt infiltration, and polymer infiltration and pyrolysis.

3. The method of claim 1, wherein the binder solution comprises a solvent, a dispersant, and one of polyvinyl alcohol and polyvinyl butyral.

4. The method of claim 3, wherein the ceramic particles comprise one or a combination of silicon carbide, boron carbide, hafnium oxide, hafnium boride, aluminum oxide, ytterbium oxide, or zirconium boride.

5. The method of claim 1, wherein the step of applying the binder solution to each of the first subset and the second subset of plies comprises one of a spraying and pipetting technique.

6. The method of claim 1, wherein each of the first subset and the second subset of plies are impregnated with the binder solution.

7. A method of forming a ceramic matrix composite, the method comprising:
preparing a plurality of fibrous ceramic plies by:
applying a binder solution loaded with ceramic particles to each of a first subset of plies; and
applying the binder solution without ceramic particles to each of a second subset of plies;
arranging the plurality of plies to form a preform with a gradient along a thickness direction of the preform by:
stacking the first subset of plies to form a first zone of the preform;
stacking individual ones of the second subset of the plies on both sides of the first zone to form second zones on each side of the first zone; and
debulking the first zone and the second zones;
wherein loading of the ceramic particles is higher in the first zone than in the second zones;
removing, via a brushing technique or application of a pressurized stream of air, ceramic particles that have migrated into the second zones during debulking; and
densifying the preform with a ceramic matrix.

8. The method of claim 7 and further comprising:
applying the binder solution with the ceramic particles to a third subset of plies; and
stacking individual ones of the third subset of plies on both sides of the first zone and between the first and second zones to form third zones on each side of the first zone.

9. The method of claim 8, wherein arranging the preform comprises:
forming one of the second zones;
subsequently, forming one of the third zones;
subsequently, forming the first zone;
subsequently, forming another of the third zones; and
subsequently, forming another of the second zones.

10. The method of claim 9 and further comprising: debulking the third zones with the step of debulking the first zone and the second zones.

11. The method of claim 8, wherein arranging the preform comprises:
forming the first zone;
subsequently, forming the third zones;
subsequently debulking the first zone and the third zones;
subsequently forming the second zones; and
subsequently debulking the first zone, the second zones, and the third zones.

12. The method of claim 7, wherein the step of densifying the preform with a ceramic matrix comprises one or a combination of chemical vapor infiltration, melt infiltration, and polymer infiltration and pyrolysis.

13. The method of claim 7, wherein the binder solution comprises a solvent, a dispersant, and one of polyvinyl alcohol and polyvinyl butyral.

14. The method of claim 13, wherein the ceramic particles comprise one or a combination of silicon carbide, boron carbide, hafnium oxide, hafnium boride, aluminum oxide, ytterbium oxide, or zirconium boride.

15. The method of claim 7, wherein the step of applying the binder solution to each of the first subset and the second subset of plies comprises one of a spraying and pipetting technique.

16. The method of claim 7, wherein each of the first subset and the second subset of plies are impregnated with the binder solution.

* * * * *